O. W. MURPHY.
CHEESE CUTTER CABINET.
APPLICATION FILED MAY 7, 1917.
1,255,550.
Patented Feb. 5, 1918.
2 SHEETS—SHEET 2.
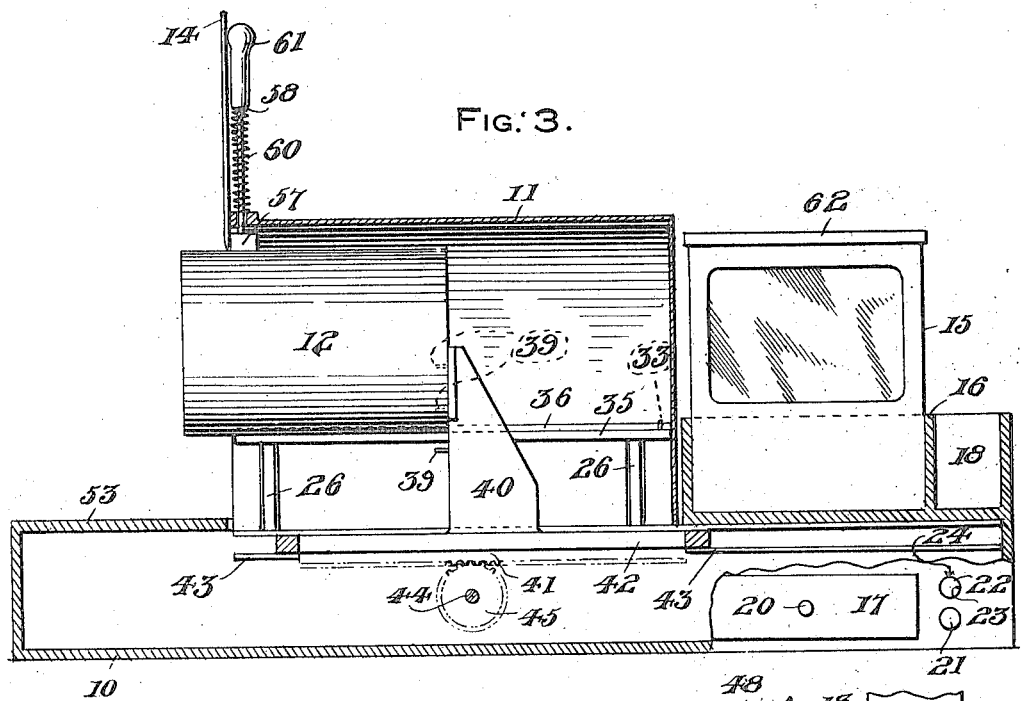
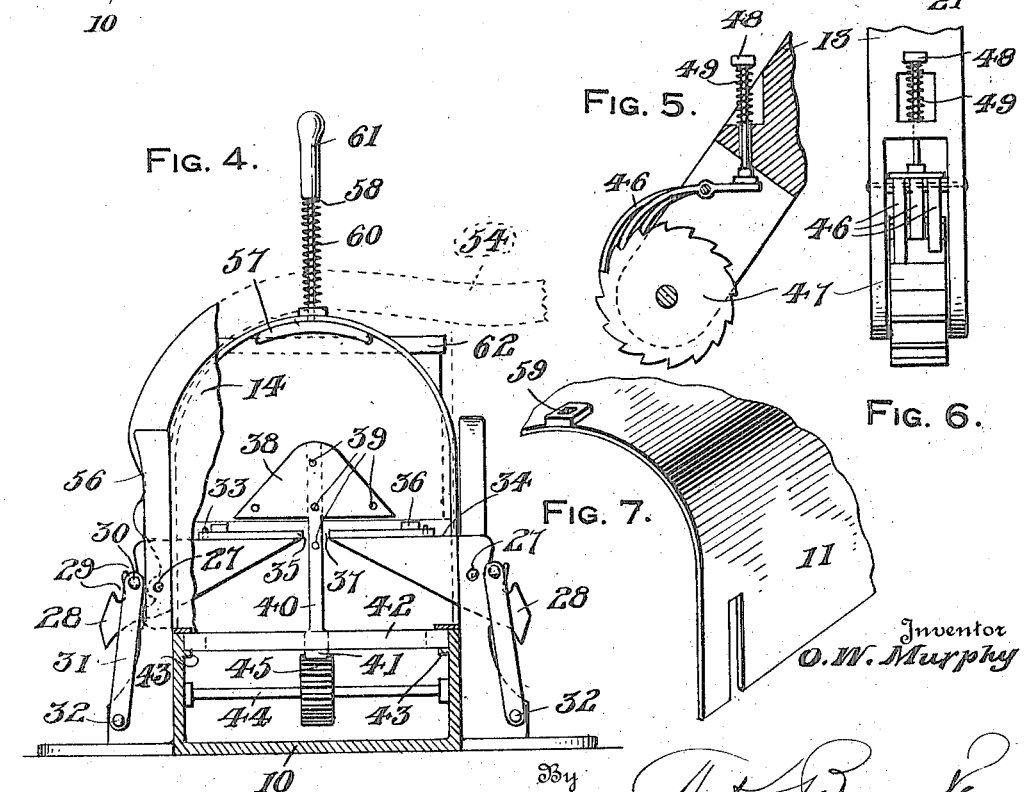
Inventor
O. W. Murphy
By T. R. Bryant
Attorney

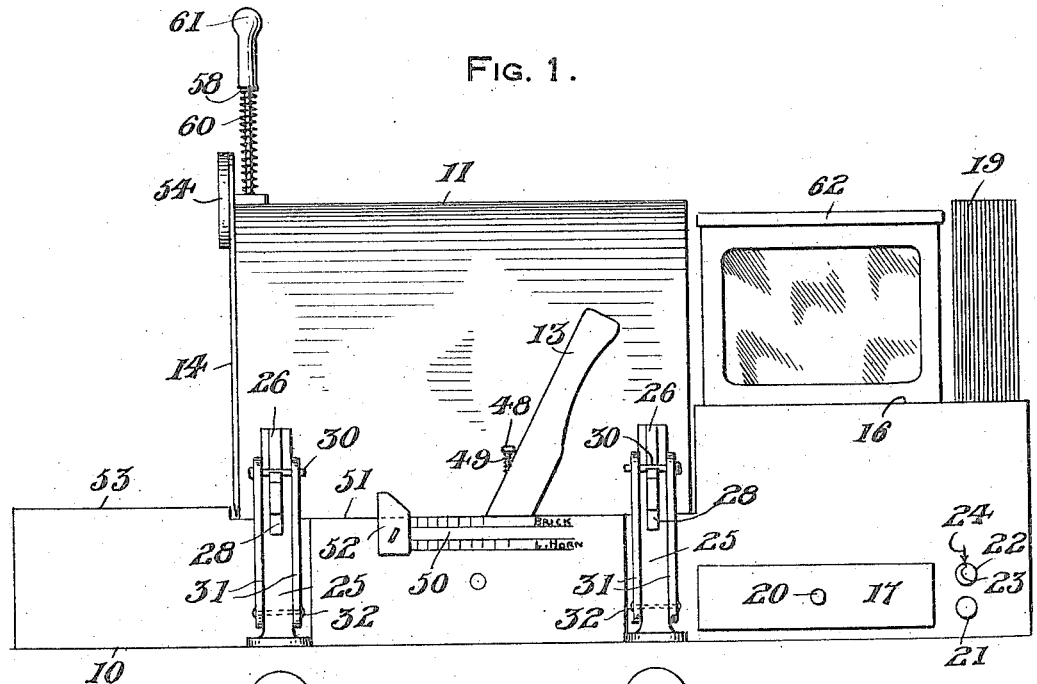
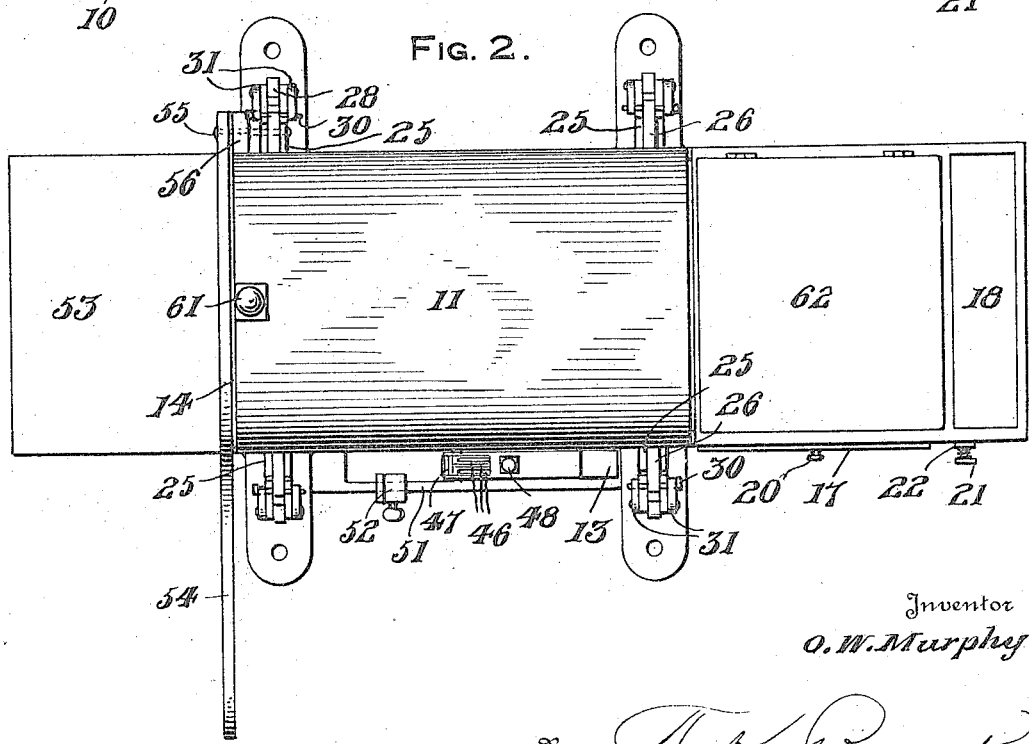

UNITED STATES PATENT OFFICE.

OLLIE W. MURPHY, OF PHILLIPSBURG, KENTUCKY.

CHEESE-CUTTER CABINET.

1,255,550.     Specification of Letters Patent.      Patented Feb. 5, 1918.

Application filed May 7, 1917. Serial No. 167,079.

*To all whom it may concern:*

Be it known that I, OLLIE W. MURPHY, a citizen of the United States, residing at Phillipsburg, in the county of Marion and State of Kentucky, have invented certain new and useful Improvements in Cheese-Cutter Cabinets, of which the following is a specification.

The present invention relates to certain new and useful improvements in cheese cutter cabinets.

The primary object of the invention is the provision of a cheese cutter adapted for operation upon cheese in either its block or horn formation, the arrangement being such as to inclose the cheese for preventing access thereto when the device is not in operation.

A further object of the device is the provision of a composite structure providing a cheese cutter, a cracker and bag holder as well as a money drawer whereby the operator may readily sell crackers and cheese and deposit the money receipts therefor in an expeditious manner without the necessity of going to different parts of the store.

A still further object of the device is the provision of a cheese cutter adapted to be adjusted for operating upon different forms of cheese and having a feed mechanism adjustable for regulating the size and value of the slice to be severed by the cutting operation.

With these general objects in view and others that will appear as the nature of the invention is better understood, the same consists in the novel construction, combination and arrangement of parts hereinafter fully described, illustrated in the accompanying drawing and pointed out in the appended claims.

In the drawing forming a part of this application and in which like numerals refer to corresponding parts throughout the several views, Figure 1 is a side elevation of the device.

Fig. 2 is a top plan view thereof.

Fig. 3 is a central vertical longitudinal sectional view of the same with parts illustrated in side elevation.

Fig. 4 is a front view of the device with parts broken away.

Fig. 5 is an enlarged sectional view of a portion of the feed mechanism.

Fig. 6 is an elevational view thereof, and

Fig. 7 is a perspective view of a front portion of the removable casing of the device.

The present device broadly consists of a base 10 having a housing or a casing 11 removably mounted thereon adapted for the reception of the cheese 12 fed forwardly by a lever 13 for cutting by means of a knife 14 while a cracker box 15 is adapted to be seated in a frame 16 at the rear end of the base and a cash drawer 17 is arranged in the base beneath the said box. A compartment 18 is also arranged in the frame 16 adapted for holding a plurality of paper bags or sacks 19 for use in packaging the crackers and cheese when vending the same.

The cash drawer 17 is slidably arranged in the base 10 and is provided with an alarm arranged therein which automatically sounds upon opening the drawer by means of its handle 20, the drawer being capable of opening only upon depressing the spring pressed catch knob 21. A safety lock 22 is provided in the form of a disk or button the arrangement being such that the drawer 17 is locked and cannot be opened until the indicating marks 23 and 24 of the button and adjacent side of the base respectively are brought into alinement with each other.

In operating the device, the desired cut of cheese is made by use of the knife 14 and the crackers are taken from the box 15 and delivered in the sacks 19. The button 22 is turned until the marks 23 and 24 correspond and the button is then turned back half a revolution whereupon by pressing the knob 21, the drawer 17 is released and may be readily opened. The drawer is automatically locked upon being again closed and is locked closed by turning the button 22 until the marks 23 and 24 are in alinement with each other.

The base 20 is provided with opposite pairs of posts 25 to which inwardly projecting arms 26 are pivoted as at 27, the outer depending ends 28 of said arms having a plurality of notches 29 therein adapted to receive the cross pieces 30 of swinging links 31 pivoted as at 32 at their lower ends to the post 25 and whereby the arms 26 are retained suitably adjusted.

The arms 26 are substantially triangular in shape having lugs 33 upon their upper faces 34 for mounting spaced platform plates 35 removably arranged thereon. When a brick form of cheese is employed, the same is flatly positioned upon the plates 35 between the cleats 36 carried thereby, the cheese is spanning the slot or opening 37 between the said plates. In this position of the arms 26 and the plates 35 the loops 31 are adjusted within the upper ones of said notches 29, but when it is desired to operate upon a horn or cylindrical piece of cheese the arms 26 as well as the plates 35 are inwardly inclined by engaging the links 31 with the lower set of notches 29.

A pusher 38 is arranged above the plates 35 having pins 39 adapted to engage the inner or rear end of the cheese 12 while the pusher 38 is transversely secured to the upper end of a support 40 carried upright by a rack 41 forming a part of a longitudinal slidable frame 42 arranged within the base 10 upon opposite guides 43.

A shaft 44 is transversely journaled through the base 10 having a pinion 45 secured thereon in constant mesh with the rack 41 while the operating lever 13 is journaled upon the outer end of the shaft 44 and is provided with a multiple pawl 46 normally maintained in contact with a ratchet wheel 47 carried by the said shaft 44. It will be understood that by forwardly shifting the lever 13, the shaft 44 will be turned, thereby feeding forwardly the support 40 and incidentally the cheese 12 upon the plates 35 for operative engagement by the knife 14. A releasing post 48 is provided for the pawl 46 being normally resiliently maintained in its inoperative position by means of a spring 49, it being evident that upon depressing the post 48, the pawl member 46 will be released from the wheel 47 permitting the support 40 to be readily returned to its rearward position. A double scale 50 is provided upon the side of a cover plate 51 for the lever 13 while a gage block 52 is adjustably mounted upon the plate 51 adapted to be retained at a suitable adjustment for limiting the forward movement of the lever 13 at the required distance to position the cheese 12 outwardly of the path of movement of the knife 14 for cutting a slice of cheese of the desired size, weight or value. It will be understood that the scale 50 may be accurately graded so that by regulating the block 52, either a square or a cylindrical piece of cheese may be cut from the supply which is of the value desired by the customer, it being only necessary to set the block 52 at the desired point upon the scale 50 and upon elevating the knife 14 to move the lever 13 forwardly for feeding the cheese, the knife 14 being thereafter depressed and severing the amount which has been accurately gaged.

The forward upper portion 53 of the base 10 constitutes a table for receiving the cheese while the cover 11 which is readily removable normally incloses the cheese 12 and the plates 35 when assembled, it being noted that the knife 14 is of sufficient size to close the forward end of the casing 11 when the knife is in its lowered inoperative position. A laterally projecting handle 54 is provided for the knife for readily shifting the same upon its pivotal connection 55 with a post extension 56 at one side of the front portion of the base 10. An arcuate foot 57 is arranged within the cover 11 having a shaft 58 extending through a perforation 59 in the forward end of the casing 11, it being noted that the shaft 52 is provided with a spring 60 for normally maintaining the foot 57 elevated; when desired to cut the cheese 12, the handle 61 upon the upper end of the shaft 58 is depressed thereby holding the foot 57 upon the cheese and holding the same rigid to be readily cut by lowering the knife 14, it being evident that upon removing the pressure from the handle 61 the foot 57 will be automatically elevated to its inoperative arrangement.

A serviceable device is provided for vending crackers and cheese, whereby the goods may be accurately measured and sold and preventing any waste thereof as well as maintaining the goods in a sanitary manner when the device is not in operation. The cracker box 15 is preferably provided with a lid 62 and it will be understood that minor changes may be made in the details of construction of the device without departing from the spirit and scope of the invention as claimed.

What I claim as new is:—

1. A device of the class described comprising a base, a casing open at its forward end removably mounted upon the base, posts carried by the base outwardly of the casing, arms pivoted to said posts extending inwardly of the casing, adjusting means for said arms, a knife pivoted transversely of said open end of the casing and cheese mounting plates carried by the said arms.

2. A device of the class described comprising a base, a casing open at its forward end removably mounted upon the base, posts carried by the base outwardly of the casing, arms pivoted to said posts extending inwardly of the casing, adjusting means for said arms, a knife pivoted transversely of said open end of the casing, cheese mounting plates removably carried by the said arms having a longitudinal space therebetween, a pusher movably arranged within said space having a transverse portion arranged above the plates and step-by-step operating means for the said pusher.

3. A device of the class described comprising a base, a casing open at its forward end removably mounted upon the base, posts carried by the base outwardly of the casing, arms pivoted to said posts extending inwardly of the casing, adjusting means for said arms, a knife pivoted transversely of said open end of the casing, cheese mounting plates removably carried by the said arms having a longitudinal space therebetween, a pusher movably arranged within said space having a transverse portion arranged from above the plates, step-by-step operating means for the said pusher, a normally retracted pressing foot arranged adjacent the forward end of said casing and an adjustable gage stop for the said pusher.

4. A cheese cabinet comprising a base, posts carried thereby, arms pivoted to the said posts, adjustment retaining links for the said arms pivoted to said posts, plates removably carried by the said arms in spaced relation adapted for tilting downwardly at one adjustment of the device, a cheese pusher slidably arranged between the said plates, operating means for the said pusher and an adjustable stop in the path of movement of the said operating means.

5. A cheese cabinet comprising a base, posts carried thereby, arms pivoted to the said posts, adjustment retaining links for the said arms pivoted to said posts, plates removably carried by the said arms in spaced relation adapted for tilting downwardly at one adjustment of the device, a cheese pusher slidably arranged between the said plates, operating means for the said pusher, a casing removably carried by the said base inclosing said plates and pusher and a cutting blade normally arranged in closing relation with respect to the forward end of the casing.

In testimony whereof I affix my signature.

OLLIE W. MURPHY.

Copies of this patent may be obtained for five cents each, by addressing the "Commissioner of Patents, Washington, D. C."